(12) United States Patent
Satarasinghe et al.

(10) Patent No.: US 8,413,215 B2
(45) Date of Patent: Apr. 2, 2013

(54) SYSTEM AND METHOD FOR EXTENDING SECURE AUTHENTICATION USING UNIQUE SESSION KEYS DERIVED FROM ENTROPY

(75) Inventors: Prasanna J Satarasinghe, McKinney, TX (US); Martin Greenwood, Grapevine, TX (US); Yoon Hee Kim, Coppell, TX (US); David Ka-Wai Hui, Fremont, CA (US); Vlad Alperovich, Dallas, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/072,013

(22) Filed: Mar. 25, 2011

(65) Prior Publication Data
US 2012/0144463 A1 Jun. 7, 2012

Related U.S. Application Data

(63) Continuation of application No. 10/821,435, filed on Apr. 9, 2004, now Pat. No. 7,930,553.

(60) Provisional application No. 60/462,105, filed on Apr. 11, 2003, provisional application No. 60/462,241, filed on Apr. 11, 2003.

(51) Int. Cl.
*H04L 29/06* (2006.01)

(52) U.S. Cl. ............ 726/3; 726/4; 726/5; 713/183

(58) Field of Classification Search .......... None
See application file for complete search history.

(56) References Cited

U.S. PATENT DOCUMENTS

| 5,398,285 | A | | 3/1995 | Borgelt |
| 5,608,780 | A | | 3/1997 | Gerszberg |
| 5,623,534 | A | | 4/1997 | Desai |
| 5,721,780 | A | * | 2/1998 | Ensor et al. ............ 713/155 |
| 5,828,737 | A | | 10/1998 | Sawyer |
| 5,956,633 | A | * | 9/1999 | Janhila ................. 455/410 |
| 5,991,292 | A | | 11/1999 | Focsaneanu |
| 5,991,639 | A | | 11/1999 | Rautiola |
| 6,104,803 | A | | 8/2000 | Weser |
| 6,463,055 | B1 | | 10/2002 | Lupien |
| 6,470,454 | B1 | | 10/2002 | Challener |
| 6,715,082 | B1 | | 3/2004 | Chang |
| 7,197,765 | B2 | | 3/2007 | Chan |
| 2003/0051041 | A1 | | 3/2003 | Kalavade |
| 2003/0171112 | A1 | | 9/2003 | Lupper |

* cited by examiner

*Primary Examiner* — Benjamin Lanier
(74) *Attorney, Agent, or Firm* — Pillsbury Winthrop Shaw Pittman LLP

(57) ABSTRACT

In some aspects of the present disclosure a device is disclosed that includes a processor; a storage unit; a user interface; a transceiver; a device identifying unit arranged to store device identifying data; a memory unit arranged to store machine-executable instructions that when executed by the processor causes a password to be generated, based on the device identifying data, that is arranged to allow the device to access a public wireless local area network (PWLAN).

19 Claims, 4 Drawing Sheets

Fig. 4a

| CDR FIELD 212 | PRESENCE M=MANDATORY C=CONDITIONAL O=OPTIONAL 214 | DESCRIPTION 216 | SOURCE 218 |
|---|---|---|---|
| RECORD TYPE | M (S-CDR/G-CDR) | THE FIELD IDENTIFIES THE TYPE OF THE RECORD e.g. S-CDR, G-CDR, M-CDR, S-SMO-CDR AND S-SMT-CDR. | ADAPTER 26 CHARGING APPLICATION |
| GGSN ADDRESS | M (S-CDR/G-CDR) | THE IP ADDRESS OF THE GGSN USED. | NETWORK MANAGEMENT, OR DURING PDP CONTEXT ACTIVATION |
| SGSN ADDRESS | M (S-CDR/G-CDR) | THE IP ADDRESS OF THE SGSN. | NETWORK MANAGEMENT |
| ROUTING AREA | | ROUTING AREA AT THE TIME OF THE RECORD CREATION. | NETWORK MANAGEMENT, OR RECEIVED FROM THE CLIENT |
| LOCAL AREA CODE | O (S-CDR) | LOCATION AREA CODE AT THE TIME OF THE RECORD CREATION. | NETWORK MANAGEMENT, OR RECEIVED FROM THE CLIENT |
| CELL IDENTITY | O (S-CDR) | CELL ID AT THE TIME OF THE RECORD CREATION. | NETWORK MANAGEMENT, OR RECEIVED FROM THE CLIENT |
| GGSN ADDRESS USED | M (S-CDR) | THE IP ADDRESS OF THE GGSN CURRENTLY USED. THE GGSN ADDRESS IS ALWAYS THE SAME FOR AN ACTIVATED PDP. | WAIN SERVER CHARGING APPLICATION, OR DURING PDP CONTEXT ACTIVATION |
| ACCESS POINT NameNI | M (S-CDR/G-CDR) | THIS FIELD CONTAINS THE LOGICAL ACCESS POINT NAME USED TO DETERMINE THE ACTUAL CONNECTED ACCESS POINT. APN COMPRISES OF MANDATORY NETWORK IDENTIFIER AND OPTIONAL OPERATOR IDENTIFIER (THIS FIELD IS THE NETWORK IDENTIFIER). APN CAN ALSO BE A WILDCARD, IN WHICH CASE SGSN SELECTS THE ACCESS POINT ADDRESS. SEE GSM 09.60 [22] AND GSM 03.60 [8] FOR MORE INFORMATION ABOUT APN FORMAT AND ACCESS POINT DECISION RULES. THE ACCESS POINT NAME IS INFORMATION FROM THE MS OR SGSN, THAT MAY BE USED BY THE GGSN TO DIFFERENTIATE BETWEEN ACCESSES TO DIFFERENT EXTERNAL PACKET DATA NETWORKS USING THE SAME PDP TYPE. | NETWORK MANAGEMENT, RECEIVED FROM THE CLIENT OR THE AP |
| APN SELECTION MODE | O (S-CDR/G-CDR) | THIS FIELD INDICATES HOW THE SGSN SELECTED THE APN TO BE USED. THE VALUES AND THEIR MEANING ARE AS SPECIFIED IN GSM 09.60 [22] CLAUSE 7.9 'INFORMATION ELEMENTS'. | MODE IS SELECTED BY THE ADAPTER 26 BASED ON THE SELECTION ALGORITHM |

TO Fig. 4b

Fig. 4b  FROM FIG. 4a

| | | | |
|---|---|---|---|
| PDP TYPE | M (S-CDR/G-CDR) | THIS FIELD DEFINES THE PDP TYPE, e.g. X.25, IP, PPP, OR IHOSS:OSP (SEE GSM 09.60 FOR EXACT FORMAT). | SELECTED BY THE TYPE OF PDP CONTEXT USED |
| DYNAMIC ADDRESS FLAG | C (G-CDR) | THIS FIELD INDICATES THAT PDP ADDRESS HAS BEEN DYNAMICALLY ALLOCATED FOR THAT PARTICULAR PDP CONTEXT. FIELD IS MISSING IF ADDRESS IS STATIC, i.e. PART OF PDP CONTEXT SUBSCRIPTION. DYNAMIC ADDRESS ALLOCATION MIGHT BE RELEVANT FOR CHARGING e.g. THE DURATION OF PDP CONTEXT AS ONE RESOURCE OFFERED AND POSSIBLE OWNED BY NETWORK OPERATOR. | SELECTED BASED ON THE PDP ADDRESS SELECTION METHOD |
| NODE ID | O (S-CDR/G-CDR) | THIS FIELD CONTAINS AN OPTIONAL OPERATOR CONFIGURABLE IDENTIFIER STRING FOR THE NODE WHICH GENERATED THE CDR. | NETWORK MANAGEMENT |
| LOCAL RECORD SEQUENCE NUMBER | O (S-CDR/G-CDR) | THIS FIELD INCLUDES A UNIQUE RECORD NUMBER CREATED BY THIS NODE. THE NUMBER IS ALLOCATED SEQUENTIALLY INCLUDING ALL CDR TYPES. THE NUMBER IS UNIQUE WITHIN ONE NODE, WHICH IS IDENTIFIED EITHER BY FIELD NODE ID OR BY RECORD DEPENDENT NODE ADDRESS (SGSN ADDRESS, GGSN ADDRESS, RECORDING ENTITY). THE FIELD CAN BE USED e.g. TO IDENTIFY MISSING RECORDS IN POST PROCESSING SYSTEM. | ADAPTER 26 CHARGING APPLICATION |
| ACCESS POINT NAME OI | O (S-CDR) | THIS FIELD CONTAINS THE LOGICAL ACCESS POINT NAME USED TO DETERMINE THE ACTUAL CONNECTED ACCESS POINT. APN COMPRISES OF MANDATORY NETWORK IDENTIFIER AND OPTIONAL OPERATOR IDENTIFIER (THIS FIELD IS THE OPERATOR IDENTIFIER). APN CAN ALSO BE A WILDCARD, IN WHICH CASE SGSN SELECTS THE ACCESS POINT ADDRESS. SEE GSM 09.60 [22] AND GSM 03.60 [8] FOR MORE INFORMATION ABOUT APN FORMAT AND ACCESS POINT DECISION RULES. THE ACCESS POINT NAME IS INFORMATION FROM THE MS OR SGSN, THAT MAY BE USED BY THE GGSN TO DIFFERENTIATE BETWEEN ACCESSES TO DIFFERENT EXTERNAL PACKET DATA NETWORKS USING THE SAME PDP TYPE. | ADAPTER 26 CHARGING APPLICATION |
| RECORD SEQUENCE NUMBER | C (S-CDR/G-CDR) | THIS FIELD CONTAINS A RUNNING SEQUENCE NUMBER EMPLOYED TO LINK THE PARTIAL RECORDS GENERATED IN THE SGSN/GGSN FOR A PARTICULAR PDP CONTEXT (CHARACTERIZED WITH SAME THE CHARGING ID AND GGSN ADDRESS PAIR). IN THE S-CDR THE SEQUENCE NUMBER IS ALWAYS STARTED FROM ONE AFTER INTER-SGSN ROUTING AREA UPDATE, SEE FIELD "SGSN CHANGE". THE RECORD SEQUENCE NUMBER IS MISSING IF THE RECORD IS THE ONLY ONE PRODUCED IN THE SGSN/GGSN FOR THE PDP CONTEXT (e.g. INTER-SGSN ROUTING AREA UPDATE CAN RESULT TO TWO S-CRSs WITHOUT SEQUENCE NUMBER AND FIELD "SGSN UPDATE" PRESENT IN THE SECOND RECORD). | ADAPTER 26 CHARGING APPLICATION |

SYSTEM AND METHOD FOR EXTENDING SECURE AUTHENTICATION USING UNIQUE SESSION KEYS DERIVED FROM ENTROPY

CROSS-REFERENCE TO RELATED APPLICATIONS

This application is a continuation of U.S. application Ser. No. 10/821,435 filed Apr. 9, 2004 now U.S. Pat. No. 7,930,553, which claims the benefit and priority of U.S. Provisional Application No. 60/462,105, filed Apr. 11, 2003 and U.S. Provisional Application No. 60/462,241, filed Apr. 11, 2003. The foregoing applications are hereby incorporated by reference in their entirety. In addition, this application is related to U.S. application Ser. No. 09/851,681, filed on May 8, 2001, which is commonly assigned and incorporated herein by reference in its entirety.

BACKGROUND

The present invention relates generally to communications systems and more particularly, to a system and method for utilizing existing communications networks.

With the advancement of telecommunication technologies, subscriber identity modules (SIMs), also known as a type of smart cards, are becoming increasingly prevalent for wireless customers. However, legacy communications networks, such as a public wireless local area network (PWLAN), may be unable to provide network access to customers based on their SIMs.

Accordingly, it is desired to provide a means for SIM users to access the PWLANs in a secured environment and to allow an unified accounting scheme.

It is also desired to provide a cost effective solution, so that extensive modifications will not be required for the existing PWLANs.

BRIEF DESCRIPTION OF THE DRAWINGS

FIGS. 4A-4B illustrate one form of accounting information according to one embodiment of the present disclosure.

DETAILED DESCRIPTION

Figure 1:
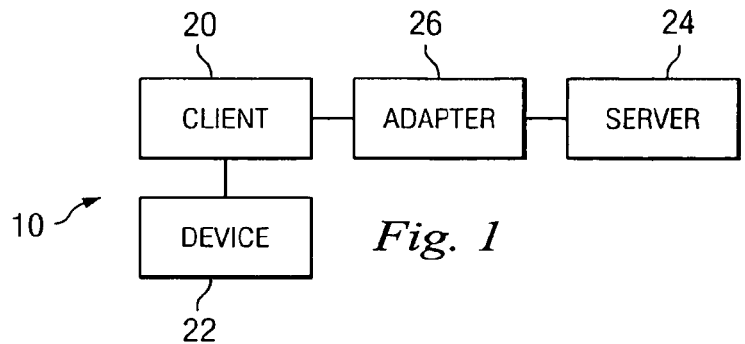
FIG. 1 illustrates a simplified communications system according to one embodiment of the present disclosure.

For the purposes of promoting an understanding of the principles of the invention, references will now be made to the embodiments, or examples, illustrated in the drawings and specific languages will be used to describe the same. It will nevertheless be understood that no limitation of the scope of the invention is thereby intended. Any alterations and further modifications in the described embodiments, and any further applications of the principles of the invention as described herein, are contemplated as would normally occur to one skilled in the art to which the invention relates.

The present disclosure relates generally to the field of communications systems, and more particularly, to a system and method for utilizing existing communications networks.

The current disclosure may be utilized in the following example: a laptop equipped with a subscriber identity module (SIM) attempts to access a traditional public wireless local area network (PWLAN). However, since the PWLAN includes a typical remote authentication dial-in client services (RADIUS) authentication, authorization, and accounting (AAA) server that is unable to authenticate the laptop based on the SIM, the laptop is unable to access the PWLAN. Therefore, it is desired to provide an adapter system that facilitates the communication between the laptop and the PWLAN.

Referring now to FIG. 1, shown therein are selected components of a communications system 10 according to one embodiment of the present disclosure. In this example, a client 20, which may be a laptop computer equipped with a device 22, which may contain an international mobile subscriber identity (IMSI), may attempt to access a server 24, which may be a RADIUS AAA server. However, the server 24 is unable to authenticate the client 20 based on the IMSI. Accordingly, the present disclosure provides an adapter 26, which may be used to facilitate the communication between the client 20 and the server 24.

Figure 2:
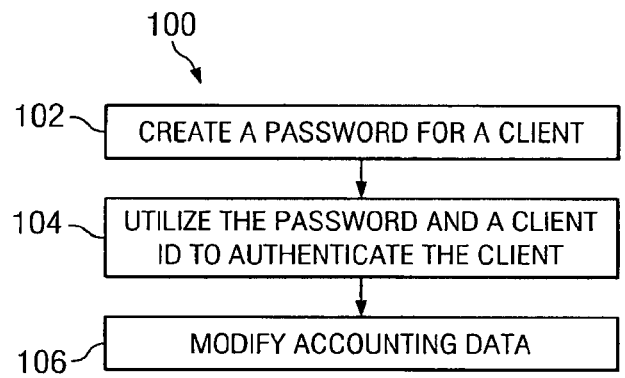
FIG. 2 illustrates a method for utilizing existing communications networks according to one embodiment of the present disclosure.

Referring now to FIG. 2, shown therein is a method 100 for facilitating the communication between the client 20 and the server 24 according to one embodiment of the present disclosure. In this embodiment, the method 100 may assist the authentication and/or billing of the client 20 in the PWLAN environment. Step 102 of the method 100 creates a password for the client 20, step 104 of the method 100 utilizes the password and a client id to authenticate the client, and step 106 of the method modifies accounting data of the client 20. The method 100 will be further described below in connections with FIG. 3.

Figure 3:
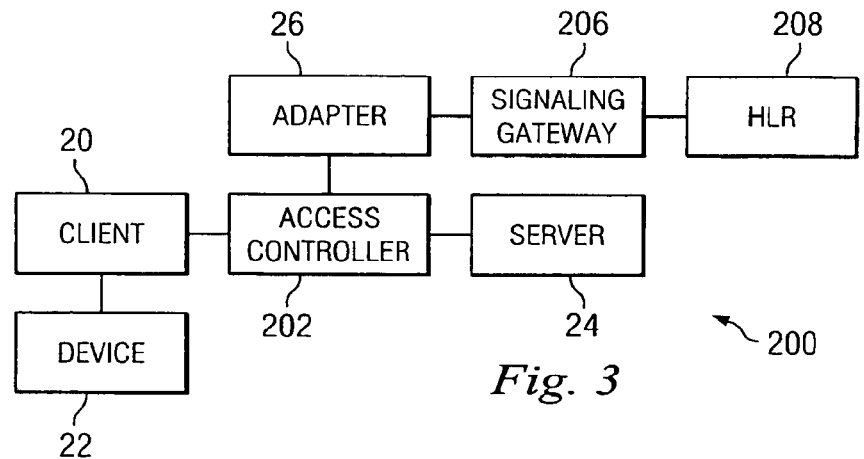
FIG. 3 illustrates a system for implementing the method of FIG. 2 according to one embodiment of the present disclosure.

Referring now to FIG. 3, shown therein is an implementation of the methods 100 according to one embodiment of the present disclosure. In this embodiment, a network 200 may include the client 20, which may comprise or may be connected to the device 22, an access controller 202, the server 24, the adapter 26, a signaling gateway 206, and a home location register (HLR) 208.

Here, the client 20 may comprise a computing device such as a personal computer, personal digital assistant, pager, cellular telephone, and the like. For the sake of example, the client 20 may include a central processing unit (CPU), a memory unit, an input/output (I/O) device, and an external interface. The external interface may be, for example, a modem, a wireless transceiver, and/or one or more network interface cards (NICs). It is understood that the client 20 may be differently configured and that each of the listed components may actually represent several different components. For example, the CPU may represent a multi-processor or a distributed processing system; the memory unit may include different levels of cache memory, main memory, hard disks, and remote storage locations; and the I/O device may include monitors, keyboards, and the like.

In furtherance of the example, the device 22 may include a Subscriber Identity Module (SIM) card, universal SIM card, any other smart card, or any other means for identifying the client 20. In one example, the SIM card may include an IMSI or other identification devices. The SIM card is included in each mobile phone that conforms to the global system for mobile communications (GSM) and many personal communications services (PCS) handsets. Each SIM card contains a microchip that houses a microprocessor with on-board memory. The SIM card also identifies the caller to the mobile network as being a legitimate caller. The SIM card may resemble a credit card that can be inserted into the client 20, or it may be an integral part of the client 20.

The access controller 202 may be a system that provides secure access to services, resources, data, telephone switches or LANs. It may provide access control and routing functionality to a device, such as the client 20, through access points (not shown) and other network routing devices.

The server 24 may provide authentication services to determine the identity of a client attempting to access the PWLAN. It may comprise a Remote Authentication Dial-In User Service (RADIUS) server or any other servers. RADIUS is an authentication and accounting system used by many interne service providers (ISP) and end user organizations to provide secure Internet access, especially in a Virtual Private Networks (VPN) application. When the ISP is dialed, user name and password must be entered and passed to a RADIUS server, which verifies the information, and then authorizes access to the ISP systems and network. RADIUS is a client/server-based authentication software system that centralizes the administration of user profiles maintained in authentication databases.

The adapter 26 may comprise one or more software programs written in a high-level and/or standard programming language, such as C, C++, or Java. It may be utilized to authenticate the client 20, provide PWLAN access to the client 20, and/or manage and deliver accounting data. In one example, the adapter 26 may include one or more of the following application programs, each of which may be written in a high-level and/or standard language, such as C, C++, Java, or other languages:

General Packed Radio Server (GPRS)/Global System for Mobile Communications (GSM) Authentication Application: it may manage client authentication based on GPRS or GSM.
Extensible Authentication Protocol (EAP)-SIM Authentication Application: it may manage client authentication based on EAP-SIM.
Password Application: it may generate a password for the client.
Mobile Application Part (MAP) over Internet Protocol (IP) Inter-working: it may communicate with the HLR 208 to fetch subscriber information.
Database: it may store identification information and a password for the client 20.
Transport for SIM Based Application: it may serve as a transport for authentication messages between the client 20 and the adapter 26.
Accounting Application: it may manage call detail recording (CDR) based accounting upon receiving RADIUS accounting messages.
SIM Gateway Application: when the adapter 26 is configured as a gateway server, it may transfer the EAP-SIM authentication messages received on the transport layer to the remote AAA EAP-SIM server in the client 20's home network.

The signaling gateway 206 may provide signaling system 7 (SS7) or SS7 over IP standard for communication between the adapter 26 and the HLR 208. SS7 typically employs a dedicated 64 kilobit data circuit to carry packetized machine language messages about each call connected between and among machines of a network to achieve connection control. The signaling gateway 206 may provide the following functions: supervising—it may monitor the status of a line or circuit to see if it is busy, idle or requesting services; alerting—it may indicate the arrival of an incoming call by signals such as bells, buzzers, woofers, tones, strobes and lights; and addressing—it may transmit routing and destination signals in the form of dial pulses, tone pulses or data pulses over loops, trunks and signaling networks.

The HLR 208 may comprise a database that holds subscription information and authentication triples of every subscriber in the network. The HLR 208 may be a permanent SS7 database used in cellular networks, such as Advanced Mobile Phone system (AMPS), GSM and PCS. The HLR 208 may be located on the Signal Control Point (SCP) of the cellular provider of record, and may be used to identify/verify a subscriber, and/or store subscriber data related to features and services. In a roaming scenario, the local service provider queries the HLR 208 via a SS7 link. Once verified, client data is transferred via SS7 to and maintained at the Visitor Location Register (VLR) during the period of roaming activity within the coverage area of the provider.

The method 100 will now be further described. Referring to FIGS. 2 and 3, in an exemplary operation of the method 100, the client 20 may comprise an application program (not shown), which may be written in any standard language, such as C, C++, or Java. According to methods known in the art, the application program may enable the client 20 to search for and identify the adapter 26 and initiate an authentication request through the access controller 202 by providing its identification information, which may be an IMSI, contained in the device 22. As a result, the access controller 202 may forward the identification information to the adapter 26, which may in turn convey the identification information to the HLR 208 for authentication.

In furtherance of the example, once the HLR 208 has authenticated the identification information supplied by the client 22, it may send a success message to the adapter 26, which may notify the client 20 of the successful completion of the authentication. Then, an application program (not shown) residing on the adapter 26 may generate an one-time password for use in connection with the RADIUS authentication described below. Independently, an application program (not shown) residing on the client may also generate an identical password for the client 20.

The process of generating the password for the client 20 is now further described. In one embodiment, the password may be generated based on information that identifies the client 20, such as the IMSI, a pseudonym, or any other information that identifies the client 20. In one example, the password may be derived as follows:

$$\text{password} = F(\text{generating a hash value} \\ (\text{Username} | n^* \text{Value} | \text{``sim direct''}))$$

Username: comprises the identification information of the client 20, such as a pseudonym, a permanent identity (which may be IMSI), or any other information that is associated with the client 20.
n: a digital number.
Value: comprises Kc, which is a 64-bit ciphering key known in the art; MicroSoft-Microsoft Point-to-Point Encryption (MS-MPPE)-Send-Key; MS-MPPE-Recv-Key; or any other value that is suitable for generating the password,
n*Value: represents concatenating n number of Values together.
sim direct: comprises the character string of "sim direct".
F: represents a function that converts a hash value into an alpha-numeric string.
For example, the following octet values may be used:
H'30-H'39 (decimal 48-57), which may be represented by the values of 0 to 9.
H'41-H'5A (decimal 65-90), which may be represented by the values of A to Z.
H'61-H'7A (decimal 97-122), which may be represented by the values of a to z.

The F function may be used to convert other values into the value ranges listed above. For example, F may perform the following functions:

if an octet value ranges from 0 through 23,
   add 65 to the octet value;
if an octet value ranges from 24 through 47,
   add 41 to the octet value;
if an octet value ranges from 58 through 64,
   add 10 to the octet value;
if an octet value ranges from 91 through 96,
   add 6 to the octet value;
if an octet value ranges from 123 through 144,
   subtract 26;
if an octet value ranges from 145 through 165,
   subtract 46;
if an octet value ranges from 166 through 185,
   subtract 66;
if an octet value ranges from 186 through 205,
   subtract 86;
if an octet value ranges from 206 through 225,
   subtract 106;
if an octet value ranges from 226 through 245;
   subtract 126;
if an octet value ranges from 246 through 255;
   subtract 146.

The resulting stream may be used as the password for the client 20.

In the above descriptions, the hash value may be generated pursuant to hashing techniques. However, it is understood that any other value that is capable of uniquely identifying the client may also be utilized. The hash value may be generated using any of a variety of high entropy, less colliding techniques, such as a Secure Hash Algorithm (e.g., SHA-1), a Message Digest Algorithm (e.g., MD5), or a variation of the RACE Integrity Primitives Evaluation (e.g., RIPEMD-160) techniques. The various standards for the hashing methods are known in the art. For example, the standard for SHA-1 is described in the Federal Information Processing Standards Publication 180-1 (FIPS PUB 180-1) dated Apr. 17, 1995, and issued by the National Institute of Standards and Technology, which is hereby incorporated by reference.

It is contemplated that many variations of the above example may be applied to derive the password. In one example, the string "sim direct" may not be utilized or may be replaced by another string. In a second example, n may not be utilized. In a third example, Value may not be utilized. In a fourth example, instead of generating a hash value, other algorithms or methods may be adopted to create the password. In a fourth example, the function F may not be utilized, or may be modified. Accordingly, a variety of means may be utilized for generating the password for the client 20.

In furtherance of the example, once the application program residing on the adapter 26 has successfully generated the password, the application program (or another program) may transfer the Username and the password of the client 20 to the server 24. As a result, the server 24 may store the information in a database or on a list. Then, the adapter 26 may notify the client 20 of the generation of the password, and may convey any suitable information (such as the pseudonym of the client 20) to the client 20. Since the client 20 may access identical algorithms or methods for generating the password, an application program residing on the client 20 may proceed to generate an identical password, using the procedures described above. Then, the application program (or another program) residing on the client 20 may initiate an authentication process with the server 24 through the access controller 202, utilizing the Username and the password of the client 20.

Since the Username and the password have already been stored on the server 24, the server 24 is able to complete the authentication of the client 20 by matching the Username and the password with what have been stored on the server 24.

In furtherance of the example, upon the successful completion of the authentication process, the access controller 202 will allow the client to access the PWLAN according to methods known in the art. Later, when the access between the client 20 and the PWLAN is terminated by conventional methods, the adapter 26 may intercept the termination message. As a result, an application program residing on the adapter 26 may extract accounting data from the server 24, and modify the data to conform to general standard accounting records for Global System for Mobile Communications (GSM), General Packet Radio Service (GPRS) (for example, Call Detail Records (CDR)), or other systems. Referring now to FIGS. 4A and 4B, shown therein is a table comprising additional fields that may be inserted into RADIUS based accounting data for converting them into GPRS based accounting data according to one embodiment of the present disclosure. In that example, a Charging Data Record (CDR) filed 212 may represent fields that may be inserted into RADIUS based accounting data, a Presence column 214 may represent the conditions for the corresponding CDR fields, a Description column 216 may describe the corresponding CDR fields, and a Source column 218 may identify the source for the corresponding CDR fields. Also the following abbreviations are also used in connections with FIGS. 4A and 4B:
GGSN: represents Gateway GPRS Support Node.
SGSN: represents Gateway Serving GPRS Support Node.
PDP: represents Gateway Packet Data Protocol.
APN: represents Gateway Access Point Name.
NI: represents Gateway Network Identifier.
AP: represents Gateway Access Point.

In addition, upon the termination of the access, both the server 24 and the adapter 26 may erase the stored Username and the password of the client 20.

It is contemplated that may variations of the above example may be utilized for the present disclosure. In one example, instead of an adapter 26 that is utilized for both the initial authentication of the client 20 and the subsequent generation of the password for the client 20, separate entities may be utilized to perform the functions. In a second example, an existing device may be utilized to authenticate the client 20 through the HLR 208, and a separate device may be utilized to interact with the existing device and generate the password for the client 20.

Figure 5:
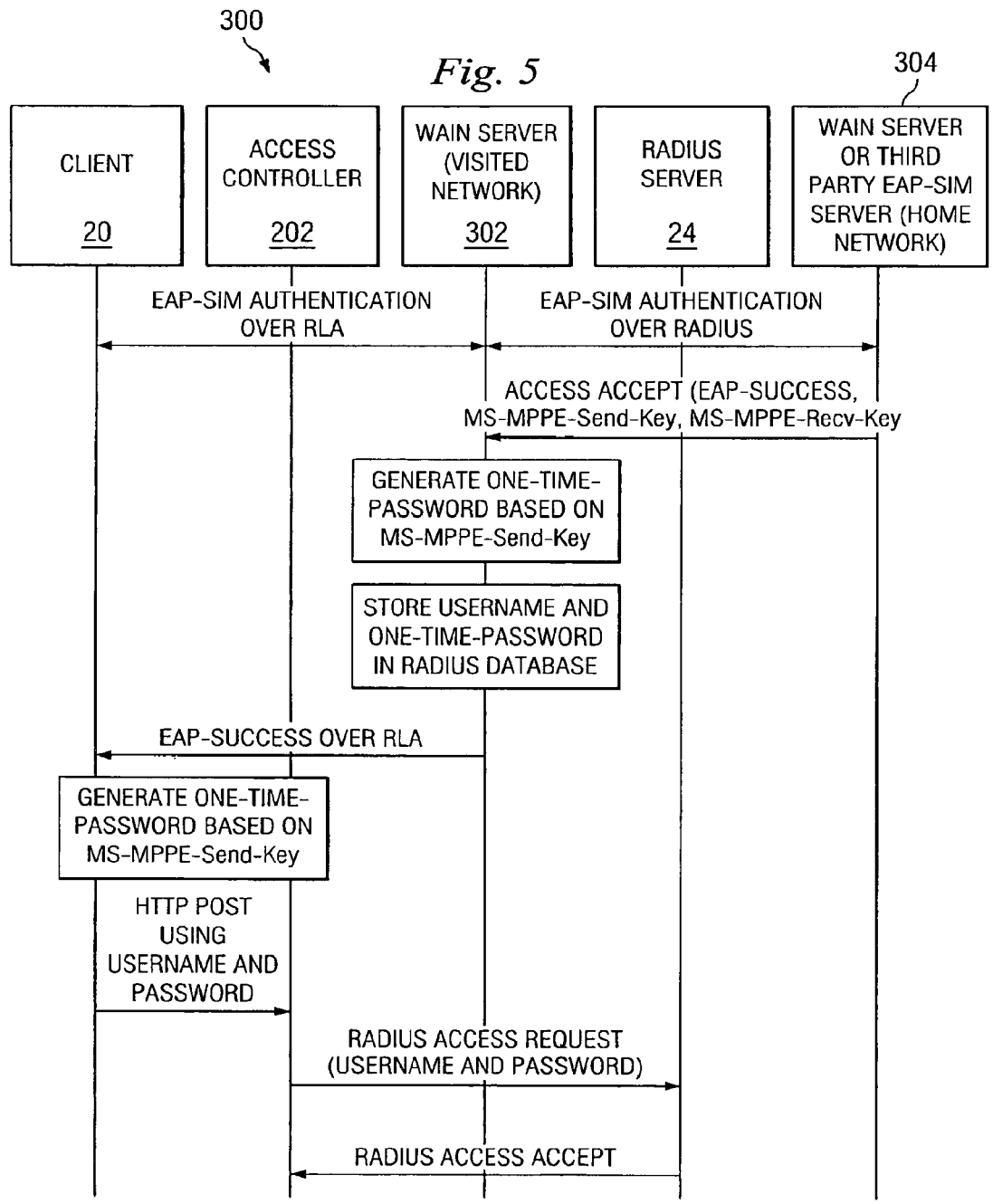
FIG. 5 illustrates a message flow system according to one embodiment of the present disclosure.

Referring now to FIG. 5, shown therein is a message flow system for implementing the method 100 according to another embodiment of the present disclosure. As many of the details have already be described in the previous embodiment in connections with FIGS. 3, 4A and 4B, only brief descriptions will be provided herein. In this example, the adapter 26 may comprise a wireless access interne node (WAIN) server, and the authentication system may comprise extensible authentication protocol (EAP)-SIM authentication.

In furtherance of the example, the client 20 may initiate the EAP-SIM authentication using a transport protocol, such as radius link adaptation (RLA) in the visited network. The client 20 may utilize a username, such as imsi@realm, or pseudonym@realm. Then, the WAIN server 302 may recognize that the authentication request should be fulfilled by the remote EAPSIM server 304, which may be another WAIN server or a third-party EAP-SIM server. Upon the successful authentication by the remote EAP-SIM server 304 pursuant to methods known in the art, the remote EAP-SIM server 304 may send Access Accept packet with EAP-Success and WEP keys (MS-MPPE-Send-Key, and MS-MPPE-Recv-Key), which are known in the art, to the WAIN server 302. Then, the WAIN server 302 may generate a password using the following algorithm:

$$Password = F(SHA\text{-}1(Username | n*MS\text{-}MPPE\text{-}Send\text{-}Key | \text{"sim gateway"}))$$

Username: it may be identical to the client identity used in the authentication procedure, and may comprise a pseudonym, or a permanent identity, such as IMSI, of the client 20.
n*MS-MPPE-Send-Key: it may comprise n number of MS-MPPE-Send-Key values concatenated together; while n may be determined during the authentication procedure.
sim gateway: it may comprise the character string "sim gateway".
F: it may represent a function of converting a hash value into an alpha-numeric string, which has been described in connections with FIG. 3.

In furtherance of the example, once the password is generated, the WAIN server 302 may store Username and the password of the client 20 in a RADIUS database residing on the RADIU server 24. Then, an EAP-Success message may be sent to the client 20, which may generate an identical password. During the process, MS-MPPE-Send-Key and MS-MPPE-Recv-Key may both be generated at the client 20, using key materials exchanged during the EAP-SIM authentication. Once the password is generated by an application program residing on the client 20, the client 20 may perform a http post to log in to the access controller 202 with Username and the password. Thereafter, the access controller 202 may send RADIUS Access Request packet to the RADIUS server 24, which in turn may authenticate the client 20.

Although only a few exemplary embodiments of this invention have been described in detail above, those skilled in the art will readily appreciate that many modifications are possible in the exemplary embodiments without materially departing from the novel teachings and advantages of this invention. Also, features illustrated and discussed above with respect to some embodiments can be combined with features illustrated and discussed above with respect to other embodiments. Accordingly, all such modifications are intended to be included within the scope of this invention.

The invention claimed is:

1. A device comprising:
a CPU;
an input/output device;
an external interface to enable the device to access a mobile network and a public wireless local area network (PWLAN);
a device identifier arranged to store device identifying data to access the mobile network; and
a memory unit storing machine-executable instructions which, when executed by the CPU, cause a first password to be generated based on the device identifying data to allow the device to access the PWLAN,
wherein the device is adapted to receive a notification from an adapter, the notification indicating generation of a second password at the adapter, wherein the second password is identical to the first password.

2. The device of claim 1, wherein the external interface is a modem, a wireless transceiver, a network interface card, or combinations thereof.

3. The device of claim 1, wherein the device identifier includes a subscriber identity module (SIM) card, a universal SIM card or an international mobile subscriber identity (IMSI) module.

4. The device of claim 1, wherein the first password is a one-time password.

5. The device of claim 1, wherein the machine-executable instructions, when executed by the CPU, cause the device to initiate an authentication request to a server of the PWLAN using the first password.

6. The device of claim 1, wherein the adaptor is adapted to authenticate the device to the mobile network.

7. The device of claim 1, wherein the second password is a one-time password.

8. The device of claim 1, wherein mobile network is at least one of a GSM network, a GPRS network, a AMPS network or a PCS network.

9. The device of claim 1, the password is generated by combining the device identifying data and an encryption key provided by the PWLAN.

10. A device comprising:
an adaptor including:
a CPU;
a memory unit storing machine-executable instructions which, when executed by the CPU, cause a first password to be generated based on identifying data of a client device and an encryption key to allow the client device to access a public wireless local area network (PWLAN); and
a transceiver configured to transmit a notification indicating generation of the first password to the client device such that a second password identical to the first password is generated at the client device.

11. The device of claim 10, wherein the client device includes a mobile computing device.

12. The device of claim 10, the password is generated by combining the identifying data and the encryption key, wherein the encryption key is provided by the PWLAN.

13. The device of claim 10, wherein the first password is a one-time password.

14. The device of claim 10, wherein the first password is used to authenticate, provide access and/or manage and deliver accounting data to the client device based on access to the PWLAN.

15. A method comprising:
receiving a notification at a client device that a first password has been generated; and
generating, at the client device, a second password based on client device identifying data and an encryption key, wherein the second password is identical to the first password and is utilized to allow the client device to access a public wireless local area network (PWLAN).

16. The method of claim 15, further comprising sending an authentication request including the second password from the client device to an authentication server, wherein the authentication server is configured to store the first password.

17. A device comprising:
a CPU;
an input/output device;
an external interface to enable the device to access a mobile network and a public wireless local area network (PWLAN);
a device identifier arranged to store device identifying data to access the mobile network; and
a memory unit storing machine-executable instructions which, when executed by the CPU, cause a first password to be generated based on the device identifying data to allow the device to access the PWLAN,
wherein the device is adapted to receive a message from an adapter, the message including:

information indicating a part of the device identifying data used for the generation of a second password at the adapter, and wherein, upon receipt of the message, the first password is generated based on the part of the device identifying data used for the generation of the second password at the adapter, the second password being identical to the first password.

18. The device of claim 10, wherein the transceiver is further configured to transmit information to the client device, the information indicating a part of the identifying data of the client device which is used for the generation of the first password at the adapter.

19. The method of claim 15, further comprising receiving information indicating a part of the client device identifying data used for the generation of the first password, wherein said generating includes generating, at the client device, the second password based on the part of the client device identifying data used for the generation of the first password and the encryption key.

\* \* \* \* \*